July 12, 1932.                P. WILMART                1,866,958
STABILIZER FOR MOTOR VEHICLES
Filed Dec. 26, 1929            2 Sheets-Sheet 1
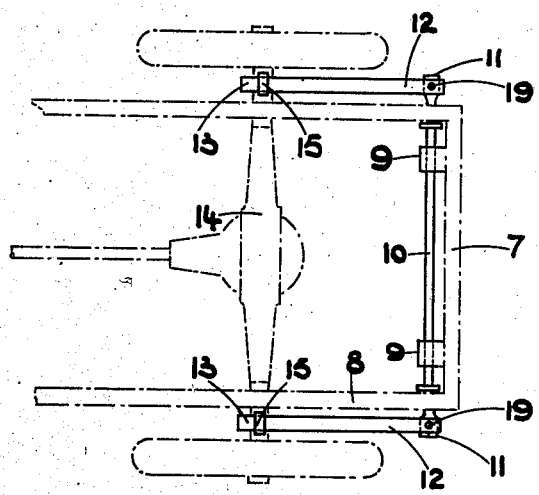
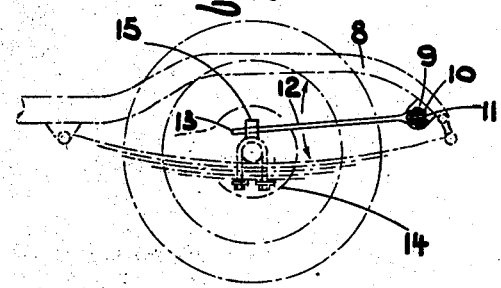
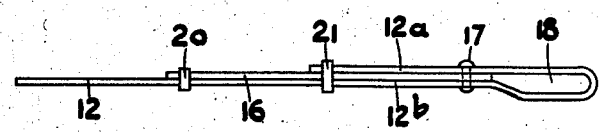
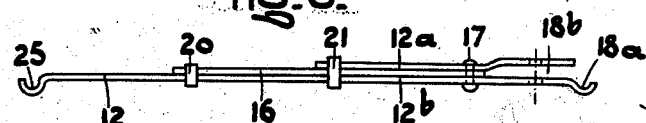
Inventor
Pierre Wilmart
By B. Singer, atty.

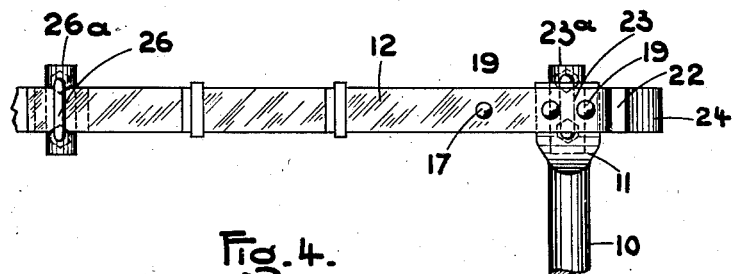
Fig.4.
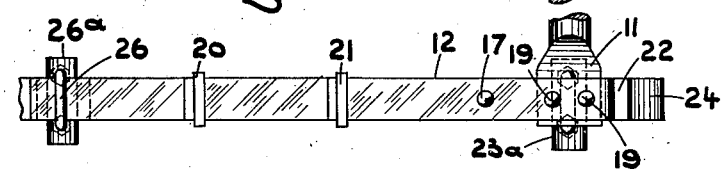
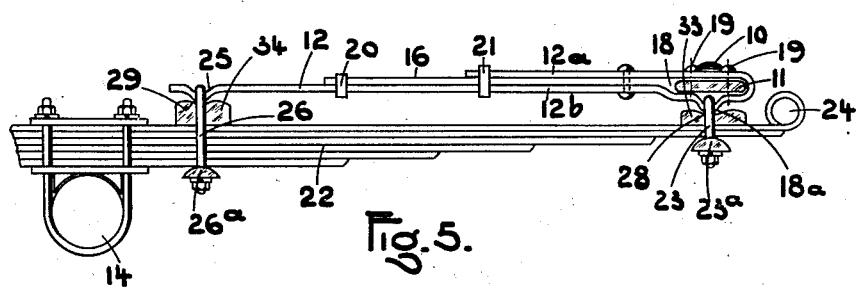
Fig.5.
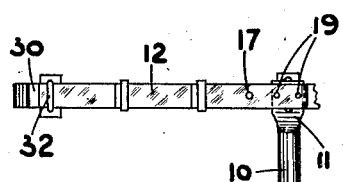
Fig.6.
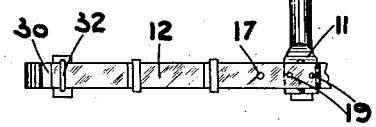
Fig.7.

Patented July 12, 1932

1,866,958

UNITED STATES PATENT OFFICE

PIERRE WILMART, OF BRUSSELS, BELGIUM

STABILIZER FOR MOTOR VEHICLES

Application filed December 26, 1929, Serial No. 416,595, and in Belgium April 13, 1929.

My invention relates to an efficient and readily applicable device adapted to reduce the disagreeable and dangerous "rolling" in motor vehicles, which is due to the unevenness of the road or to the effect of the centrifugal force when the vehicle is engaged in a curve, and which is particularly intense when the chassis of the vehicle is mounted on highly flexible suspension springs, as it is usual at present to do, said device being also adapted to exert a braking action upon the bending and recoil strokes of said suspension springs.

By simple way of example, several embodiments of the stabilizer constructed in accordance with my invention, are illustrated in the accompanying diagrammatical drawings in which:

Fig. 1 is a diagrammatical plan view of one embodiment of my device, showing its application to the rear axle of the vehicle.

Fig. 2 is a side elevation corresponding to Fig. 1.

Fig. 3 is a detail view showing the construction of one of the arms of the device.

Fig. 4 is a plan view of a second embodiment of my device, showing its application to the rear suspension springs of the vehicle.

Fig. 5 is an elevation corresponding to Fig. 4.

Fig. 6 is a plan view of a third embodiment of my device, showing its application to the front suspension springs of the vehicle.

Fig. 7 is an elevation corresponding to Fig. 6.

Fig. 8 is a detail view of a modification of one of the arms of the device.

In Figs. 1 and 2, the rear cross bearer 7 of the chassis 8 carries two brackets or bearings 9 in which is mounted to oscillate a transverse member 10 of tubular shapes while the flattened end portions 11 of said members are each clamped by one end of an arm 12 parallel to the longitudinal axis of the chassis; said arms being constructed with steel leaves and their end portions 13 engaging with the ends of the axle 14 by means of slides 15.

When one end of the axle 14 is displaced toward the chassis 8, it takes with it the end of the corresponding arm 12 thereby producing an angular displacement of the tubular member 10, which in turn results in a corresponding angular displacement of the second arm 12 which tends to draw the opposite end of the axle 14 against the chassis 8.

Thus, both sides of the chassis are at any time kept at approximately the same distance from the ends of the axle body, which effect is obtained by means of the above described transmission device, the elasticity of which is determined by the structure of the arms 12, which, as stated, are constructed with steel leaves.

Fig. 3 shows a preferred construction of the arms. One leaf 12 is bent so as to form tongs having two branches 12a and 12b of different length, a second leaf 16 being interposed between the two branches and assembled therewith by means of a rivet 17 so as to leave a slot 18 adapted to receive the flattened end 11 of the tubular transverse member 10. In addition to the rivet 17 there are assembling stirrups 20, 21 provided one at the end of the leaf 16 and one at the end of the branch 12a.

According to the embodiment shown in Figs. 4 and 5 the two elastical arms 12 of the tubular transverse member 10 are mounted on the suspension springs 22.

A stirrup 23 engaging a depression 18a in the slot 18 is adapted to secure the said slot 18 to the end of the spring 22 at a point close to the eye 24.

Where the slot 18 is provided, the branch 12b is resting upon the main carrier of the spring 22 by a rounded depending portion which may be provided underneath the flattened end portion 11 of the tube 10 or at any convenient point of the length of the slot 18, or of the part 18b as shown in Fig. 8.

The end of the branch 12b, which at the same time forms the end of the arm 12 is furnished with a semi-cylindrical transversely arranged notch 25 adapted to receive the stirrup 26 connecting the said branch to the spring 22.

The anchor plates 23a, 26a of the two stirrups 23, 26 are of semi-circular cross section in order to facilitate the slight relative movements of the arms 12 and springs 22. Between the anchor plates and the nuts of the assembling stirrups there may be interposed bent or elastical metal plates in order to prevent the said stirrups from rattling.

In the depressions or notches 18a and 25 of the branch 12b there may be arranged lining members in brass, fibre or any other convenient material proper to reduce friction and prevent noise. Similar lining members may be arranged to the same purpose between the depending depressions or notches of the branches 12b and the main carriers of the suspension springs.

The embodiment illustrated in Figs. 6, 7 is merely an inversion of that shown in Figs. 4, 5.

The tubular transverse bar 10 is supported on the suspension springs 30 close to the front axle 31 while the ends of the arms 12 remote from the transverse bar are secured to the said suspension springs 30 by means of stirrups 32 at points situated near the front ends of the said springs.

In the embodiments illustrated in Figs. 4, 5, 6, 7 the action of the arms 12 may exert a braking effect upon the bending and recoil strokes of the suspension springs 22 and 30 provided there are friction shoes 33 arranged between the slot 18 and the main carrier of the suspension spring.

In like manner, similar friction shoes 34 may be interposed between the end portions of the arms 12 and the main carriers of the said suspension springs.

The braking effect exerted by my device upon the bending and recoil strokes of the suspension springs, may be adjusted by conveniently tensioning the stirrups 26 and 32.

What I claim is:

1. In combination with a vehicle axle and a pair of suspension leaf springs thereon, shock absorbing means comprising a cross bar and springs attached thereto, said cross bar being connected to the suspension springs at points near the outer ends thereof for oscillating movement and the free ends of said shock absorbing springs being connected to the suspension springs at points near the axle.

2. In combination with an axle and suspension leaf springs thereon, shock absorbing means comprising a cross bar and leaf shock absorbing springs attached thereto at their outer ends, connecting means between the ends of the shock absorbing springs and the suspension springs and comprising inverted U-shaped bolts and also comprising friction blocks arranged between the suspension springs and the shock absorbing springs.

3. In a device for stabilizing the chassis of an automobile with relation to its axle, the combination of an axle, a tubular transverse oscillating shaft mounted on the suspension springs and having flattened end portions and two resilient arms, each of which is formed of a leaf spring folded on itself to present pinchers with unequal arms and embracing at the folded portion one of the flattened ends of the said transverse shaft, supplementary leaf springs and means for fixing the device to the suspension springs.

4. In a device for stabilizing the chassis of an automobile with reference to its axle, the combination of an axle, a transverse tubular oscillating shaft mounted on the suspension springs, and having flattened end portions and two resilient arms, each formed of a flexible leaf spring folded on itself to constitute a pincher with unequal arms and embracing at its folded end one of the flattened end portions of said transverse shaft, supplementary leaf springs, and stirrups fixing the ends of said resilient arms to the suspension springs and having friction shoes.

In witness whereof I affix my signature.

PIERRE WILMART.